United States Patent [19]

Lippard

[11] Patent Number: 5,232,260
[45] Date of Patent: Aug. 3, 1993

[54] TRUCK SPLIT TAILGATE APPARATUS

[76] Inventor: Fred E. Lippard, Rte. 6, Box 627E, Albemarle, N.C. 28001

[21] Appl. No.: 886,432

[22] Filed: May 21, 1992

[51] Int. Cl.⁵ .......................................... B62D 33/037
[52] U.S. Cl. ................................ 296/51; 296/180.5; 16/328; 16/334; 292/5; 292/182; 70/DIG. 65; 49/371
[58] Field of Search .................... 296/50-51, 296/56, 57.1, 180.1, 180.2, 180.5; 49/90 PH, 366, 371, 394, 395; 16/328, 334; 292/175, 182, 5; 70/DIG. 65

[56] References Cited

U.S. PATENT DOCUMENTS

| 750,376 | 1/1904 | Lampitt | 296/56 X |
| 1,165,518 | 12/1915 | Krell | 16/334 |
| 2,045,489 | 6/1936 | Payette | 296/51 |
| 2,744,782 | 5/1956 | Backman | 296/56 X |
| 4,146,994 | 4/1979 | Williams | 49/395 X |
| 4,372,601 | 2/1983 | Smith | 296/50 |

FOREIGN PATENT DOCUMENTS 345328 12/1921 Fed. Rep. of Germany ........ 16/328

*Primary Examiner*—Dennis H. Pedder
*Attorney, Agent, or Firm*—Leon Gilden

[57] ABSTRACT

A pickup truck bed has a split tailgate construction having a first gate member pivotally mounted in a parallel relationship relative to a second gate member positioned above the first gate member. The first gate member is arranged for pivotment to provide for airfoil orientation of the second gate member, with the first gate member arranged to permit pivotment of the first gate member against the floor of the pickup truck bed to permit airflow therethrough.

3 Claims, 4 Drawing Sheets

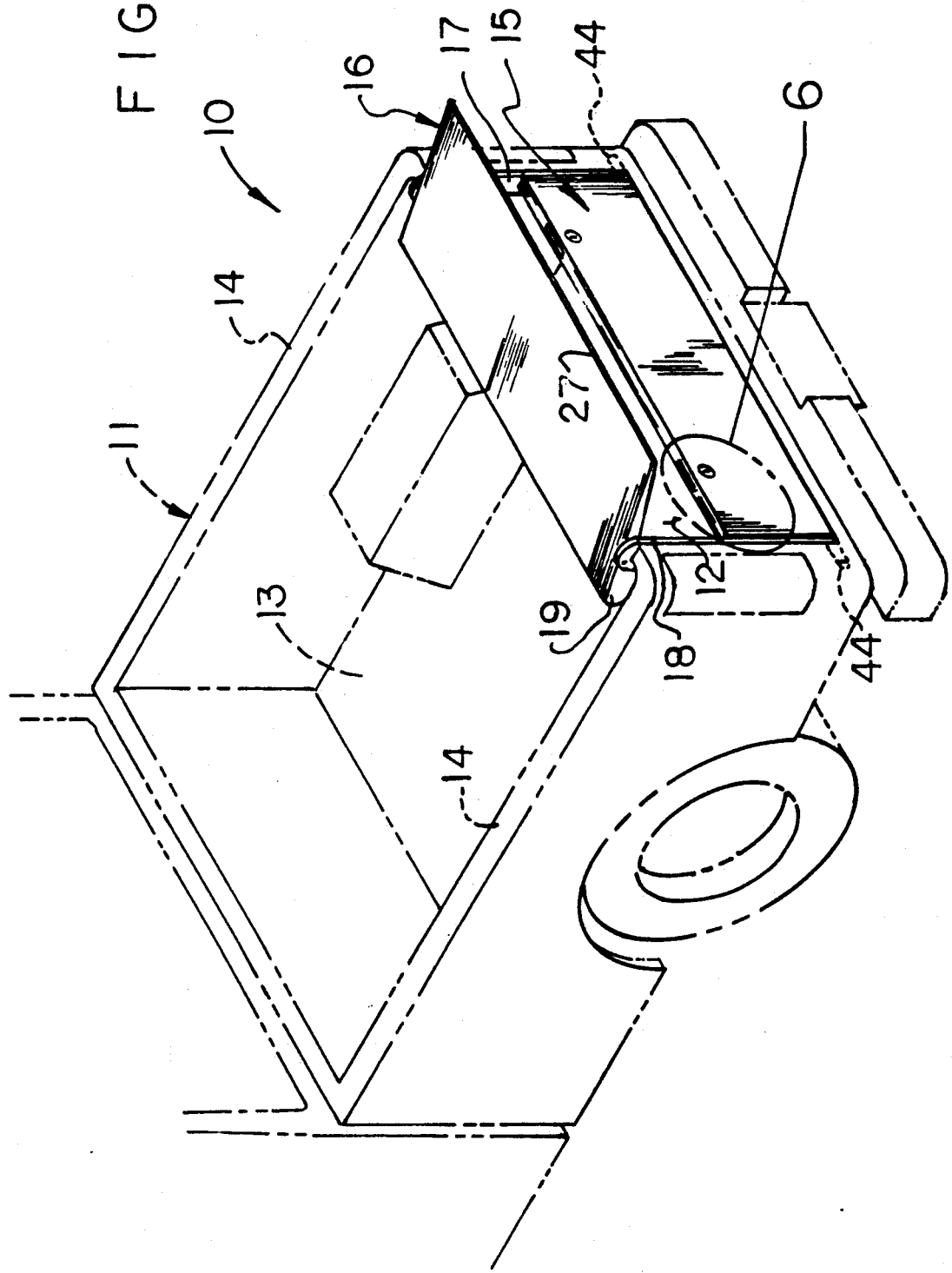

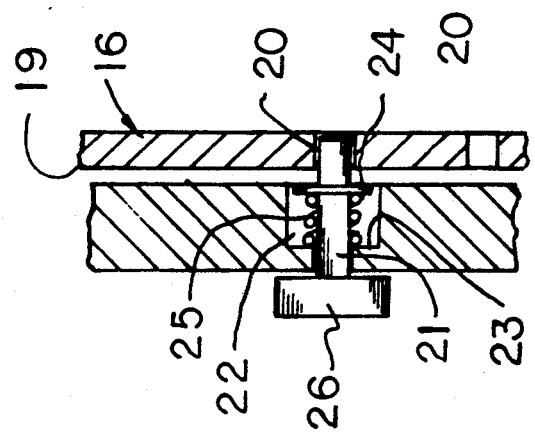
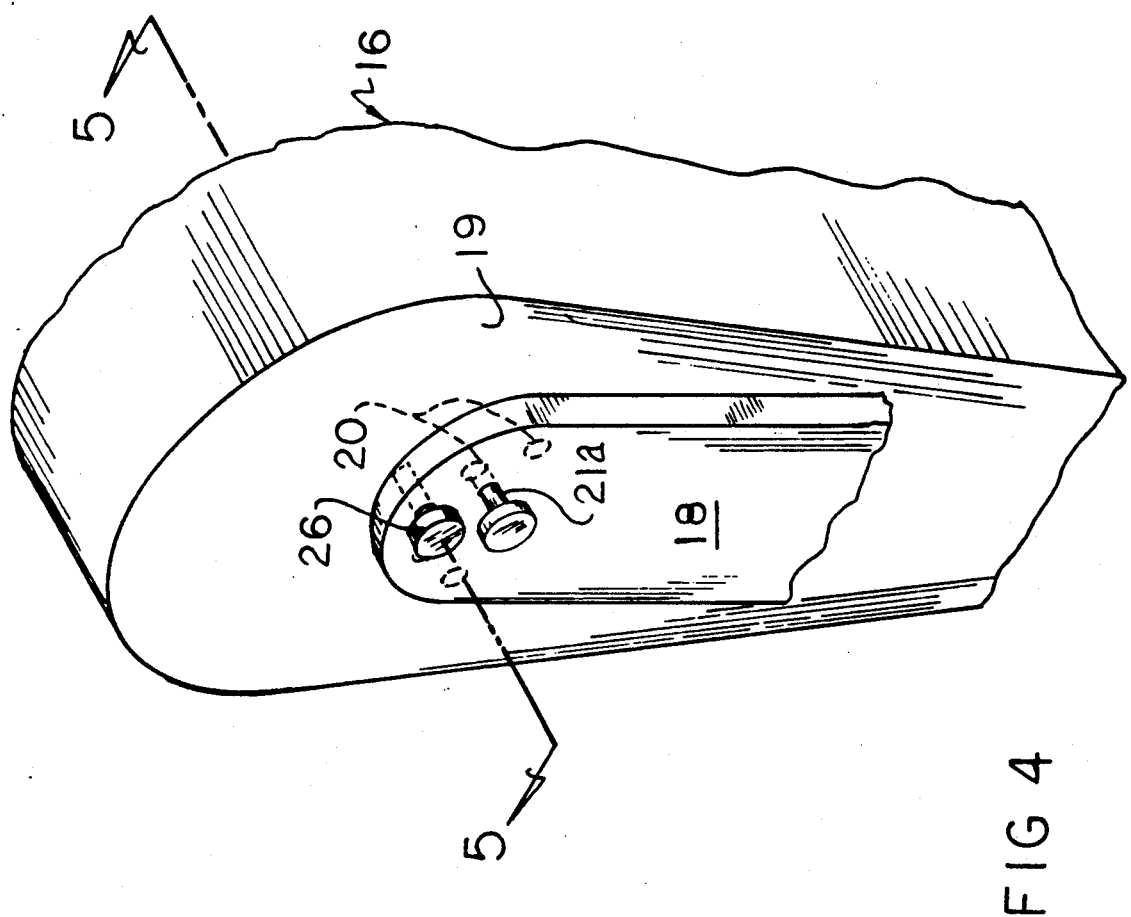

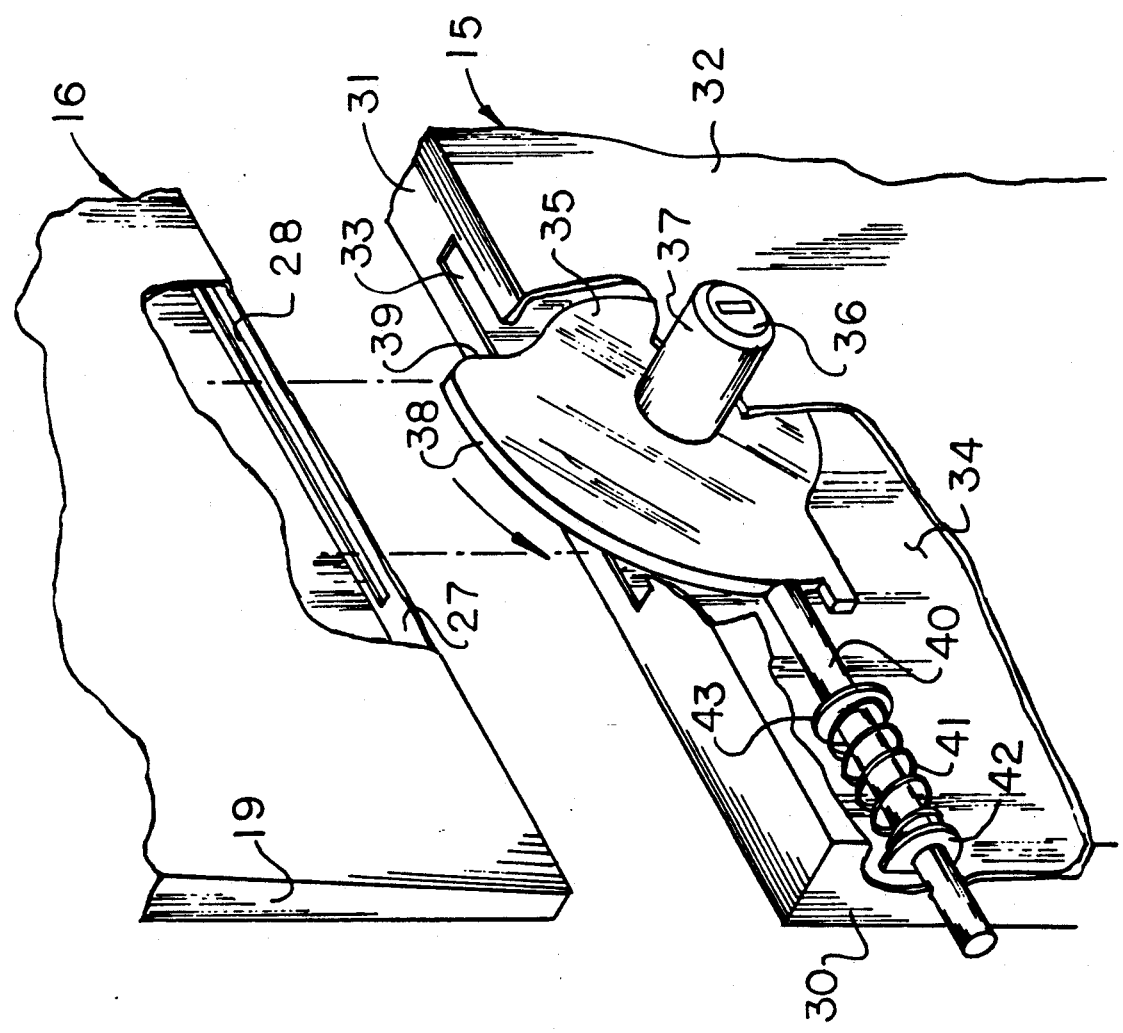

TRUCK SPLIT TAILGATE APPARATUS

BACKGROUND OF THE INVENTION

1. Field of the Invention

The field of invention relates to tailgate apparatus, and more particularly pertains to a new and improved truck split tailgate apparatus wherein the same is arranged to permit independent pivotment of an upper tailgate member relative to a lower tailgate member within a tailgate opening of a truck bed.

2. Description of the Prior Art

Conventional tailgates of pickup trucks are arranged for either a vertical orientation to permit closure and enclosing of a pickup truck bed, or alternatively are arranged to a second horizontal orientation to permit loading, when in the second horizontal orientation the tailgate projects rearwardly of the pickup truck. The instant invention attempts to overcome deficiencies of the prior art by providing for a split tailgate construction permitting maneuverability of an upper tailgate member relative to a lower tailgate member. Prior art tailgate apparatus is exemplified in the U.S. Pat. Nos. 4,750,777; 4,861,092; 4,790,589; and 4,867,499.

The U.S. Pat. No. 4,867,499 to Stephan, et al. sets forth a tailgate having wing members simultaneously mounted as a louver construction within the tailgate structure.

As such, it may be appreciated that there continues to be a need for a new and improved truck split tailgate apparatus as set forth by the instant invention which addresses the problems of ease of use as well as effectiveness in construction and in this respect, the present invention substantially fulfills this need.

SUMMARY OF THE INVENTION

In view of the foregoing disadvantages inherent in the known types of tailgate apparatus now present in the prior art, the present invention provides a truck split tailgate apparatus wherein the same is arranged to permit independent pivotment of an upper tailgate relative to a lower tailgate relative to a truck bed rear opening. As such, the general purpose of the present invention, which will be described subsequently in greater detail, is to provide a new and improved truck split tailgate apparatus which has all the advantages of the prior art tailgate apparatus and none of the disadvantages.

To attain this, the present invention provides a pickup truck bed with a split tailgate construction having a first gate member pivotally mounted in a parallel relationship relative to a second gate member positioned above the first gate member. The first gate member is arranged for pivotment to provide for airfoil orientation of the second gate member, with the first gate member arranged to permit pivotment of the first gate member against the floor of the tailgate to permit airflow therethrough.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck split tailgate apparatus which has all the advantages of the prior art tailgate apparatus and none of the disadvantages.

It is another object of the present invention to provide a new and improved truck split tailgate apparatus which may be easily and efficiently manufactured and marketed.

It is a further object of the present invention to provide a new and improved truck split tailgate apparatus which is of a durable and reliable construction.

An even further object of the present invention is to provide a new and improved truck split tailgate apparatus which is susceptible of a low cost of manufacture with regard to both materials and labor, and which accordingly is then susceptible of low prices of sale to the consuming public, thereby making such truck split tailgate apparatus economically available to the buying public.

Still yet another object of the present invention is to provide a new and improved truck split tailgate apparatus which provides in the apparatus and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 4 is an isometric illustration of section 4 as set forth in FIG. 3.

FIG. 5 is an orthographic view, taken along the lines 5—5 of FIG. 4 in the direction indicated by the arrows.

FIG. 6 is an isometric illustration, partially in section, illustrating the inner relationship and latching of the first gate member relative to the second gate member.

DESCRIPTION OF THE PREFERRED EMBODIMENT

Figure 3:
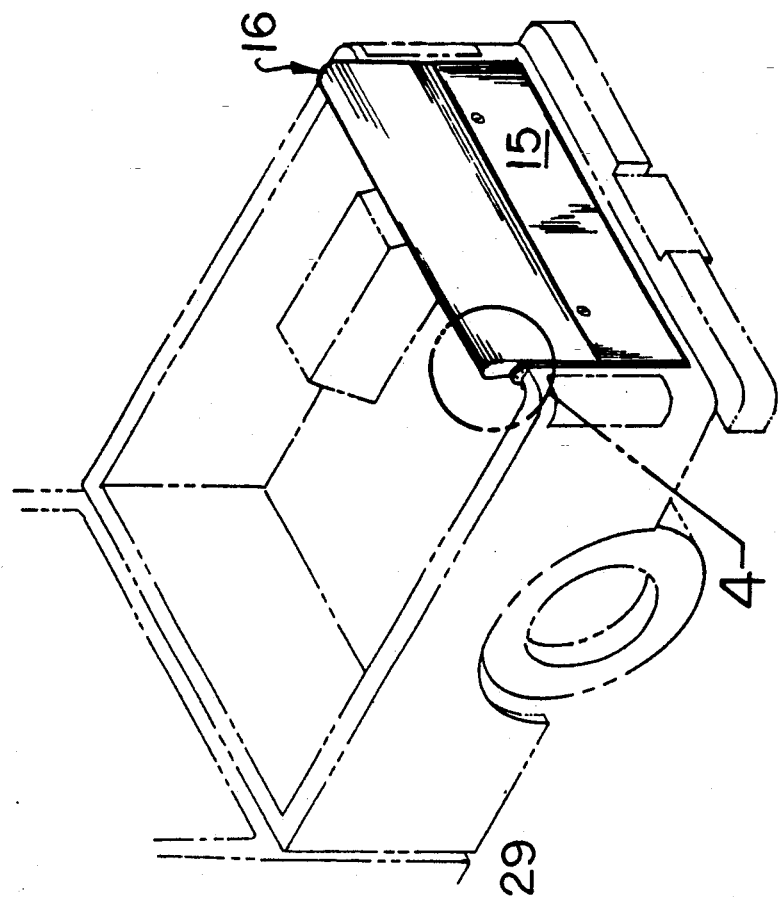
FIG. 3 is an isometric illustration of the instant invention with the tailgates arranged in a latched vertically aligned relationship.

With reference now to the drawings, and in particular to FIGS. 1 to 6 thereof, a new and improved truck split tailgate apparatus embodying the principles and concepts of the present invention and generally designated by the reference numeral 10 will be described.

More specifically, the truck split tailgate 10 of the instant invention essentially comprises the organization positioned within a truck bed 11 having a rear wall entrance opening 12, as well as a truck bed floor 13 oriented between spaced truck bed side walls 14. The apparatus 10 is arranged to include a first gate member 15 pivotally mounted within the entrance opening 12 adjacent the track bed floor 13 about first gate pivot axles 44 directed into first and second side plates 17 and 18 mounted on opposed sides of the entrance opening 12. A second gate member 16 is pivotally mounted between the first and second side plates 17 and 18 above the first gate member 15 independently thereof.

The second gate member 16 includes second gate member side walls 19, each including a semi-circular array of bolt receiving walls 20 adjacent upper ends of each side wall 19, with each array concentric and coextensive relative to one another. For purposes of illustration, only one such array is illustrated, but it is understood that the other such array is of a mirror image relative to the ray as illustrated in FIG. 4. A lock bolt 21 reciprocatably mounted through each of the first and second side plates 17 and 18 is arranged for selective reception with one of a plurality of bolt receiving wells 20. Each lock bolt 21 includes a side plate cavity within each side plate, with each cavity having a cavity floor 23. Each lock bolt includes a lock bolt flange 24, with a lock bolt spring 25 captured between the lock bolt flange and the associated cavity floor. The spring accordingly effects projection to one of the wells 20. A lock bolt 21 further is provided with a lock bolt handle 26 to permit ease of displacement of the lock bolt relative to one of the wells. To maintain orientation of the second gate 19 relative to the side plates 17 and 18, a lock pin 21a is further provided that is reciprocatably directed through a respective side plate into a further one of the wells 20.

Figure 2:
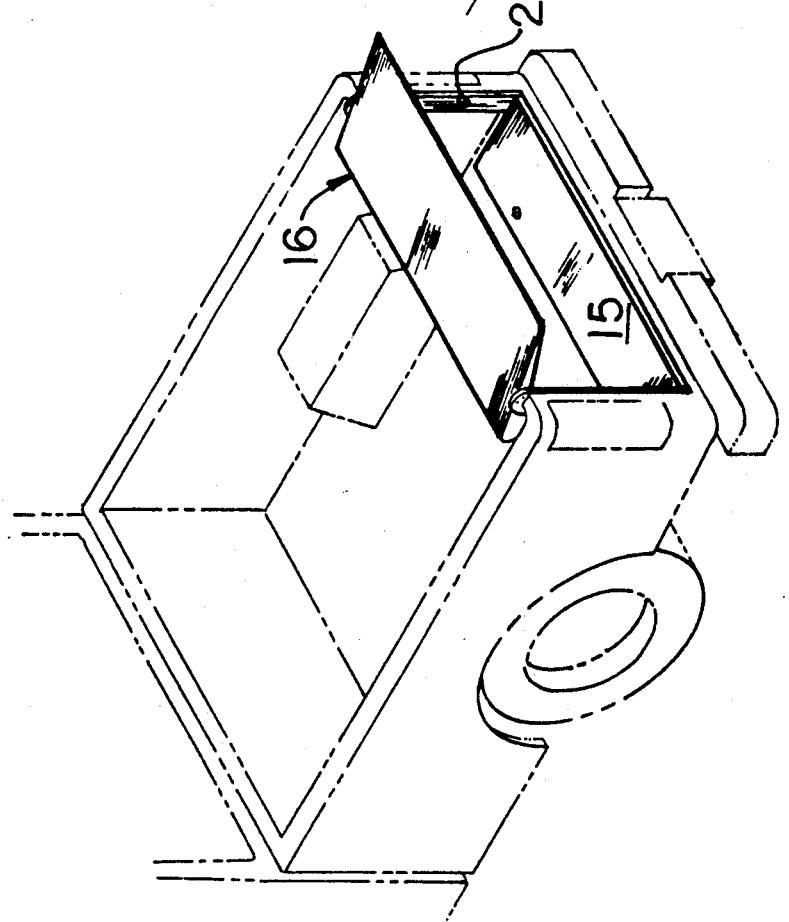
FIG. 2 is an isometric illustration of the invention with the first and second gate members arranged in a pivoted relationship relative to the tailgate rear entrance opening.

The FIG. 6 illustrates the second gate having a second gate bottom wall 27 orthogonally oriented between the second gate side walls 19. At least one bottom wall slot 28 is directed into the bottom wall of a predetermined length and a predetermined spacing relative to an associated side wall 19. The bottom wall slot 28 is arranged for cooperation with a cam disc 38, as illustrated in FIG. 6, to effect securement of the first gate member 15 to the second gate member 16. Further, the first gate member includes a reciprocating first gate latch bolt 40 that is received within a side plate bolt receiving cavity 29 of each side plate, as indicated in FIG. 2 for example, spaced above the lower distal end of each side plate. The first gate latch bolt 40 is directed through each first gate side wall 30, in a manner as indicated in FIG. 6, wherein for purposes of illustration, only one such organization is illustrated but it is understood that a mirror image of the structure is indicated in both sides of the first and second gate members 15 and 16. The first gate is further provided with a first gate top wall 31 and a first gate rear wall 32. A first gate top wall slot 33 is arranged coextensively with a respective bottom wall slot 28. Within a first gate cavity 34, each cam disc 35 is rotatable about a cam disc axle tube 37 having a lock tumbler 36 directed therethrough to permit latching of the cam disc in a predetermined rotation. Each cam disc 35 includes a cam disc extended lobe 38 and a cam disc recess lobe 39. A center lobe 38 is of a first length greater than the predetermined length between the axle tube 37 and the first gate top wall 31, wherein a second length defined between the cam disc recess lobe 39 and the top wall 31 is less than the predetermined length. Upon rotation of the cam disc extended lobe 38 projects the associated first gate latch wall 40 through an associated first gate side wall 30 into a side plate bolt receiving cavity 29, wherein continued rotation effects the rotation of the cam disc 35 to effect the recessed lobe 39 permitting reception of the first gate latch bolt 40 within the first gate cavity 34 to permit projection of each associated first gate latch bolt 40 into the first gate, as well as removing the cam disc 35 relative to the bottom wall slot 28. To bias each first gate latch bolt 40 interiorly of the first gate, a first gate spring 41 is captured between a first gate flange 42 fixedly mounted within the cavity to the first gate and the latch bolt flange 43 to effect such biasing.

In this manner, the cam disc is rotatable to permit simultaneous release of the second gate relative to the first gate and release of the first gate relative to the first and second side plates 17 and 18.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck split tailgate apparatus arranged for positioning within a truck bed, wherein the truck bed includes a rear wall entrance opening positioned above a truck bed floor and between truck bed side walls, wherein the entrance opening has a first side and a second side, and wherein the apparatus comprises:

a first side plate mounted to the first side, and a second plate member mounted to the second side, and a first gate member pivotally mounted between the first side plate and the second side plate adjacent the truck bed floor, and a second gate member pivotally mounted between the first side plate and the second side plate above the first gate member, and first latch means for pivotally positioning the first gate member relative to the first side plate and the second side plate, and second latch means for selectively securing the second gate member to the first side plate and the second side plate, and the second gate includes second gate member side walls, and each side wall includes a semi-circular array of wells, and the second latch means includes a lock bolt, the lock bolt directed through at least said first side plate and reciprocatably mounted relative to the first side plate and one of said second gate member side walls, wherein the first side plate includes a side plate cavity, the side plate cavity having a side plate cavity floor, the lock bolt including a lock bolt flange, and a lock bolt spring captured between the lock bolt flange and the cavity floor, wherein the lock bolt is reciprocatably received within one of said wells, and a lock pin directed through the first side plate arranged for reception within a further one of said wells to angularly orient the first gate member relative to the first side plate, and the second gate member includes a second gate member bottom wall, and the second gate member bottom wall includes a bottom wall slot spaced from one of said gate member side walls, and the first gate member includes a first gate member top wall, a first gate member rear wall, and spaced first gate member side walls, and the first gate member top wall includes at least one top wall slot spaced from an adjacent one of said first gate member side walls, and the first gate member having a first gate member cavity, and the second latch means includes a cam disc rotatably mounted within the first gate member cavity, with the cam disc including an axle tube rotatably mounted to the cam disc, wherein the axle tube includes a rotary tumbler directed through the axle tube and the first gate member rear wall, and the cam disc including at least one cam disc extended lobe and at least one cam disc recessed lobe, and the cam disc axle tube is spaced from the first gate top wall, and the extended lobe is arranged for projection through the first gate member top wall slot and reception within the second gate member bottom wall slot, and the cam disc recess lobe is positioned such that rotation of the cam disc effects rotation of said extended lobe in a spaced relationship relative to the first gate top wall and the second gate bottom wall.

2. An apparatus as set forth in claim 1 wherein the first latch further includes a first gate latch bolt reciprocatingly mounted relative to the cam disc and cooperative with the cam disc, wherein the first gate latch bolt is projected exteriorly through one of said first gate side walls, and wherein the first side wall plate includes a side plate bolt receiving cavity receiving the first gate latch bolt, whereupon selective rotation of the cam disc effects displacement of the first gate latch bolt from the side plate bolt receiving cavity.

3. An apparatus as set forth in claim 2 wherein the first gate latch bolt includes a first gate latch bolt flange and a first gate flange positioned within the first gate cavity and integrally mounted within the first gate cavity, and a first gate latch spring is captured between the first gate flange and the first gate latch bolt flange to bias the first gate latch bolt in contiguous communication with the cam disc.

* * * * *